United States Patent
Yan et al.

(10) Patent No.: US 11,131,766 B2
(45) Date of Patent: Sep. 28, 2021

(54) METHOD FOR THE RECOGNITION OF AN OBJECT

(71) Applicant: Aptiv Technologies Limited, St. Michael (BB)

(72) Inventors: Honghui Yan, Wuppertal (DE); Tao Zhang, Dusseldorf (DE); Wolfgang Doerr, Wiehl (DE); Alexander Ioffe, Bonn (DE)

(73) Assignee: Aptiv Technologies Limited, St. Michael (BB)

( * ) Notice: Subject to any disclaimer, the term of this patent is extended or adjusted under 35 U.S.C. 154(b) by 201 days.

(21) Appl. No.: 16/359,301

(22) Filed: Mar. 20, 2019

(65) Prior Publication Data

US 2019/0310362 A1 Oct. 10, 2019

(30) Foreign Application Priority Data

Apr. 10, 2018 (EP) .................................. 18166530

(51) Int. Cl.
 *G01S 13/90* (2006.01)
 *G01S 13/50* (2006.01)
 (Continued)

(52) U.S. Cl.
 CPC .......... *G01S 13/9027* (2019.05); *G01S 7/415* (2013.01); *G01S 13/505* (2013.01); *G01S 13/589* (2013.01);
 (Continued)

(58) Field of Classification Search
 CPC ............... G01S 13/9027; G01S 13/505; G01S 13/9017; G06K 9/00516; G06K 9/00543
 See application file for complete search history.

(56) References Cited

U.S. PATENT DOCUMENTS

| 4,958,638 A | 9/1990 | Sharpe et al. |
| 5,689,268 A | 11/1997 | Shi |

(Continued)

FOREIGN PATENT DOCUMENTS

| CN | 104 360 336 A | 2/2015 |
| DE | 102010062235 | 6/2012 |

(Continued)

OTHER PUBLICATIONS

Caspar, "Performance Comparison Between a Camera Only AEB-FCW and a Camera-Radar Fusion Aeb-FCW", Sep. 2017, 8 pages.

(Continued)

*Primary Examiner* — Kevin Ky
(74) *Attorney, Agent, or Firm* — Colby Nipper PLLC

(57) ABSTRACT

In a method for the recognition of an object by means of a radar sensor system, a primary radar signal is transmitted into an observation space, a secondary radar signal reflected by the object is received, a Micro-Doppler spectrogram of the secondary radar signal is generated, and at least one periodicity quantity relating to an at least essentially periodic motion of a part of the object is determined based on the Micro-Doppler spectrogram. The determining of the at least one periodicity quantity includes the following steps: (i) determining the course of at least one periodic signal component corresponding to an at least essentially periodic pattern of the Micro-Doppler spectrogram, (ii) fitting a smoothed curve to the periodic signal component, (iii) determining the positions of a plurality of peaks and/or valleys of the smoothed curve, and (iv) determining the periodicity quantity based on the determined positions of peaks and/or valleys.

17 Claims, 5 Drawing Sheets

(51) Int. Cl.
*G06K 9/00* (2006.01)
*G01S 7/41* (2006.01)
*G01S 13/58* (2006.01)
*G01S 13/931* (2020.01)

(52) U.S. Cl.
CPC ........ *G01S 13/9017* (2013.01); *G01S 13/931* (2013.01); *G06K 9/00516* (2013.01); *G06K 9/00543* (2013.01); *G01S 2013/93271* (2020.01)

(56) References Cited

U.S. PATENT DOCUMENTS

| | | | |
|---|---|---|---|
| 5,689,286 | A | 11/1997 | Shi et al. |
| 6,121,916 | A | 9/2000 | McDade |
| 6,653,971 | B1* | 11/2003 | Guice ................... A01M 1/026 342/22 |
| 6,674,394 | B1 | 1/2004 | Zoratti |
| 8,854,251 | B2 | 10/2014 | Tokoro |
| 10,929,653 | B2 | 2/2021 | Yan et al. |
| 2002/0028003 | A1 | 3/2002 | Krebs et al. |
| 2003/0225517 | A1 | 12/2003 | Schiffmann |
| 2010/0074379 | A1* | 3/2010 | Li ........................... G01S 7/021 375/343 |
| 2010/0286543 | A1* | 11/2010 | Patil ..................... A61B 5/7264 600/523 |
| 2011/0077532 | A1* | 3/2011 | Kim ..................... A61B 5/0205 600/485 |
| 2011/0102234 | A1* | 5/2011 | Adams .................. G01S 13/888 342/22 |
| 2013/0329523 | A1 | 12/2013 | Karl |
| 2014/0261887 | A1 | 9/2014 | Groot et al. |
| 2016/0054438 | A1* | 2/2016 | Patole ....................... G01S 7/35 342/127 |
| 2016/0124087 | A1 | 5/2016 | Stainvas et al. |
| 2016/0259037 | A1* | 9/2016 | Molchanov .............. G06K 9/78 |
| 2016/0320853 | A1* | 11/2016 | Lien ........................ G01S 13/66 |
| 2017/0057497 | A1* | 3/2017 | Laur .................. G06K 9/00348 |
| 2017/0085771 | A1* | 3/2017 | Schwager ............. H04N 13/282 |
| 2017/0097413 | A1* | 4/2017 | Gillian .................... G01S 13/90 |
| 2017/0276788 | A1* | 9/2017 | Wodrich ............. G01S 13/931 |
| 2017/0356991 | A1 | 12/2017 | Yosoku et al. |
| 2019/0137606 | A1* | 5/2019 | Buddendick ............ G01S 13/42 |
| 2019/0206070 | A1* | 7/2019 | Nash ......................... G06T 7/37 |
| 2019/0318162 | A1 | 10/2019 | Yan et al. |
| 2020/0064444 | A1 | 2/2020 | Regani et al. |
| 2020/0124706 | A1* | 4/2020 | Buddendick .......... G01S 13/931 |
| 2020/0142029 | A1* | 5/2020 | Brooker .................. G01S 7/352 |
| 2020/0160046 | A1 | 5/2020 | Andreou et al. |

FOREIGN PATENT DOCUMENTS

| | | |
|---|---|---|
| DE | 102014218092 | 3/2016 |
| DE | 10 2015 007 040 A1 | 12/2016 |
| DE | 10 2016 213 254 B3 | 7/2017 |
| DE | 10 2016 215 102 A1 | 12/2017 |
| DE | 102016213007 | 1/2018 |
| EP | 1367411 | 12/2003 |
| EP | 2589979 | 5/2013 |
| WO | 2017039862 | 3/2017 |

OTHER PUBLICATIONS

Ghaleb, et al., "A refine Micro-Doppler Analysis of Pedestrians in ISAR Imaging", Jun. 2008, 4 pages.
Gürbüz, et al., "Detection and Identification of Human Targets in Radar Data", Proc. SPIE 6567, Signal Processing, Sensor Fusion, and Target Recognintion XVI, 656701, May 7, 2007, 12 pages.
Kim, et al., "Human Detection Using Doppler Radar Based on Physical Characteristics of Targets", Feb. 2015, pp. 289-293.
Lupfer, et al., "Increasing FastSLAM Accuracy for Radar Data by Integrating the Doppler Information", Mar. 4, 2017, 4 pages.
Schafer, "What is a Savitzky-Golay Filter", Jul. 2011, 7 pages.
Van Dorp, et al., "Feature-based Human Motion Parameter Estimation with Radar", May 2008, pp. 135-145.
"Extended European Search Report", EP Application No. 18166844.3, Oct. 9, 2018, 7 pages.
"Notice of Allowance", U.S. Appl. No. 16/361,897, filed Sep. 17, 2020, 8 Pages.
Fei, et al., "Human Gait Recognition Using Micro-Doppler Features", May 2012, pp. 331-335.
Yan et al: "Micro-Doppler Based Classifying Features for Automotive Radar VRU Target Classification", Jun. 5, 2017, 8 pages.
Gurbuz Sevgi Zubeyde et al: "Operational assessment and adaptive selection of micro-Doppler features", Dec. 1, 2015, pp. 1196-1204.
"Notice of Allowance", U.S. Appl. No. 16/361,897, filed Dec. 2, 2020, 8 pages.
"Supplemental Notice of Allowance", U.S. Appl. No. 16/361,897, filed Jan. 25, 2021, 2 pages.

* cited by examiner

METHOD FOR THE RECOGNITION OF AN OBJECT

TECHNICAL FIELD OF INVENTION

The present invention relates to a method for the recognition of an object by means of a radar sensor system, wherein a primary radar signal is transmitted into an observation space, a secondary radar signal reflected by the object is received, a Micro-Doppler spectrogram of the secondary radar signal is generated, and at least one periodicity quantity relating to an at least essentially periodic motion of a part of the object is determined based on the Micro-Doppler spectrogram.

BACKGROUND OF INVENTION

Radar sensor systems are used in a wide range of applications. For example, modern motor vehicles are often equipped with radar sensor systems to detect other vehicles, obstacles or vulnerable road users such as pedestrians or cyclists. A detection and classification of objects in a traffic space from a host vehicle is in particular needed for various advanced driver assistance systems (ADAS), such as advanced emergency braking (AEB) systems, adaptive cruise control (ACC) systems and autonomous driving systems.

Often, the known Doppler effect is used to gather information relating to moving objects. The Doppler effect or Doppler shift is a change in frequency observed when a wave source moves relative to the receiver. The Doppler frequency shift mainly results from the movement of the observed object as a whole, i.e. in case of an observed pedestrian from the movement of the pedestrian's torso and in case of an observed cyclist from the movement of the frame of the bike. Beside this shift resulting from the main body movement, there usually are sidebands relating to moving parts of the object. For example, swinging arms or legs of a pedestrian as well as rotating wheels or pedals of a bike can cause additional Doppler shifts. Such additional shifts are discernible in a Micro-Doppler spectrogram. Generally, a Micro-Doppler spectrogram of the secondary radar signal is generated for a predefined period of time which is called "observation period". The generation of Micro-Doppler spectrograms is disclosed, for example, in the book of Chen V. C., "*The Micro-Doppler Effect in Radar*", Artech House, 2011, or in the paper of Yan et al., "Micro-Doppler Based Classifying Features for Automotive Radar VRU Target Classification", 25th International Technical Conference on the Enhanced Safety of Vehicles (ESV), Jun. 5-8, 2017, Detroit, Mich., United States.

The superposition of Doppler shifts from each individual component is called a "Micro-Doppler-signature". Micro-Doppler-signatures can be analyzed to classify detected objects. The use of Doppler spectrograms for a discrimination of pedestrians is disclosed, for example, in the paper of Gürbüz S. Z. et al., "*Detection and Identification of Human Targets in Radar Data*", SPIE 6567, Signal Processing, Sensor Fusion and Target Recognition XVI, 656701, May 2007.

Since the above mentioned motions of arms, legs, wheels or other individual components usually are of an essentially periodic nature, they cause at least essentially periodic patterns in a Micro-Doppler spectrogram. By determining a periodicity quantity relating to such a pattern, it is possible do discriminate between different types of objects, for example between humans and vehicles or between humans and animals. The at least one periodicity quantity can be an average cycle duration, an average repetition frequency or a number of time bins related to one period or cycle of the pattern. In case of a pedestrian, the periodicity quantity is characteristic for the pedestrian's gait cycle. One gait cycle usually corresponds to two footsteps.

To determine the repetition frequency of a pattern in a Micro-Doppler spectrogram, a Fourier analysis of the spectrogram can be carried out. However, this approach requires a relatively long observation time, which often is not available in real-world scenarios. In particular automotive applications require a comparatively short observation time.

Moreover, Fourier analyses generally rely on the assumption that the speed of the observed object is constant. This assumption, however, is violated in many cases. For example, a pedestrian might suddenly slow down or even stop. A Fourier analysis is not adequate for such situations.

It has also to be noted that a Fourier analysis is not convenient for a segmentation process, i. e. for finding the starting position and ending position of a pattern. In many applications, however, a reliable segmentation process is desired.

For the above mentioned reasons, it is in practice difficult to correctly identify objects by means of a Micro-Doppler analysis.

SUMMARY OF THE INVENTION

Described herein are techniques to enable a reliable recognition of objects by means of a radar sensor system even under adverse circumstances.

In accordance with the invention, the determining of the at least one periodicity quantity includes the steps:
(i) determining the course of at least one periodic signal component corresponding to an at least essentially periodic pattern of the Micro-Doppler spectrogram,
(ii) fitting a smoothed curve to the periodic signal component,
(iii) determining the positions of a plurality of peaks and/or valleys of the smoothed curve, and
(iv) determining the periodicity quantity based on the determined positions of peaks and/or valleys.

By means of a method in accordance with the invention, it is possible to reliably identify periodic motion components of an observed object even in case the speed of the object varies. A long observation time is not required.

If the positions of the peaks and/or valleys of the smoothed curve are known, it is relatively easy to estimate the repetition frequency, the period or a similar quantity. For example, the period can be determined as the distance between two consecutive peaks or valleys.

A periodic pattern in a Micro-Doppler spectrogram is a series of similar features being spaced apart from one another. In the context of the present disclosure, a periodic pattern is a spectrogram structure that has an essentially periodic appearance and thus contains periodic information. However, a periodic pattern is not necessarily periodic in a strict mathematical sense.

Therefore, signal components that correspond to periodic patterns of a Micro-Doppler spectrogram likewise are not periodic in a strict mathematical sense. Rather, such signal components contain periodic information, but have a strongly fluctuating course exhibiting numerous local peaks and valleys. It is thus difficult to directly obtain the periodic information from the course of a raw signal component extracted from the spectrogram. By fitting a smoothed curve to the signal component, however, it is possible to estimate the real maxima and minima.

Advantageous embodiments of the invention can be seen from the dependent claims, from the following description and from the appended figures.

In the step (ii), the smoothed curve can be fitted to the periodic signal component by means of an adaptive curve-fitting process. Such a process is able to adapt itself to varying conditions. A corresponding curve-fitting process is particularly robust.

According to an embodiment of the invention, at least one process parameter of the adaptive curve-fitting process is continuously adapted during the curve-fitting process. Variations of the process dynamics can thus be compensated.

Preferably, the process parameter is adapted based on a determined speed variation of the object. Thus, situations like a sudden stop or a quick acceleration of the object can be handled. The speed of the object can be captured or measured, preferably by means of the radar sensor system. Alternatively, the speed can be determined based on a-priori-information.

In step (i), the course of an upper envelope, a lower envelope and/or a difference between an upper envelope and a lower envelope of the Micro-Doppler spectrogram can be determined as the at least one periodic signal component. These signal components are relatively easy to be extracted from the spectrogram. In principle, strong radar reflection components like a pedestrian's torso signal or a cyclist's pedal or wheel signal can be determined as periodic signal components.

In step (ii), the fitting of the smoothed curve to the periodic signal component can be performed using a window function, in particular using a triangle kernel, a polynomial kernel, or a Savitzky-Golay kernel. Preferably, a high-order kernel is used. A window function is a mathematical function that is zero-valued outside of a predefined interval. By applying a window function to a strongly fluctuating input function, an effective smoothing of the input function can be achieved. In principle, the step (ii) can include applying a moving average filter to the periodic signal component.

In accordance with an embodiment of the invention, the window size of the window function is continuously adapted during the fitting of the smoothed curve to the periodic signal component. This has turned out to provide particularly robust results. Preferably, the window size is adapted in dependence on the speed of the object and/or a speed variation of the object. Dependent on the application, the observed speed or the actual speed may be used.

The Micro-Doppler spectrogram may be generated by means of a time-frequency analysis, in particular by means of a Short-Time-Fourier-Transform (STFT) or a Wigner-Ville-Distribution technique (WVD technique). Dependent on the application, the secondary radar signal or a signal derived from the secondary radar signal may be subjected to a time-frequency analysis. Either the secondary radar signal itself or a signal derived from the secondary radar signal may be subjected to the time-frequency analysis.

The step (iii) can include a segmentation process, wherein the first peak of a sequence of peaks is defined as a starting position of a segment and/or the last peak of a sequence of peaks is defined as an ending position of a segment. Objects can be classified more reliably if the borders of individual pattern segments are known.

In step (iv), the periodicity quantity can be estimated by means of a recursive state estimator, in particular a Kalman Filter. By means of a recursive state estimator, it is possible to achieve particularly reliable results. The recursive state estimator may use a state vector including the speed of the object and the length of a motion cycle.

According a further embodiment of the invention, the step (i) includes determining a spread measure of the Micro-Doppler spectrogram. A preferred spread measure is the difference between an upper envelope and a lower envelope of the Micro-Doppler spectrogram.

The periodic signal component can be determined by means of a percentile-based method or a curve-fitting method. Specifically, it is possible to calculate the cumulative amplitude distribution for each time slice and to determine the upper envelope to correspond to a percentile of about 95% of the cumulative amplitude distribution function and/or to determine the lower envelope to correspond to a percentile of about 5% of the cumulative amplitude distribution function. It is also possible to calculate the cumulative amplitude distribution for each time slice and to determine the observed object speed to correspond to a percentile of about 50% of the cumulative amplitude distribution function. According to an embodiment of the invention, a percentile-based method or a curve-fitting method as disclosed in the paper of Gürbüz S. Z. et al., "*Operational assessment and adaptive selection of micro-Doppler features*", IET Radar Sonar Navig., Vol. 9, Iss. 9, pp. 1196-1204, 2015, may be used to determine the observed object speed.

The invention also relates to a system for the recognition of an object comprising a radar sensor system for transmitting a primary radar signal into an observation space and for receiving a secondary radar signal reflected by the object and an electronic processing device for processing the secondary radar signal.

According to the invention, the electronic processing device is configured for carrying out a method as disclosed above.

Dependent on the application, the electronic processing device may be united with the radar sensor system or configured as a separate unit. The electronic processing device may comprise a computer.

Preferably, the radar sensor system is configured to be mounted at or in a motor vehicle.

The invention further relates to a computer program product including executable program code which, when executed, carries out a method as disclosed above.

The disclosure with reference to the inventive method is also true for the inventive system and the inventive computer program product.

Further features and advantages will appear more clearly on a reading of the following detailed description of the preferred embodiment, which is given by way of non-limiting example only and with reference to the accompanying drawings.

BRIEF DESCRIPTION OF DRAWINGS

Subsequently, the present invention is explained in more detail based on an exemplary embodiment with reference to the accompanying figures, wherein.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1:
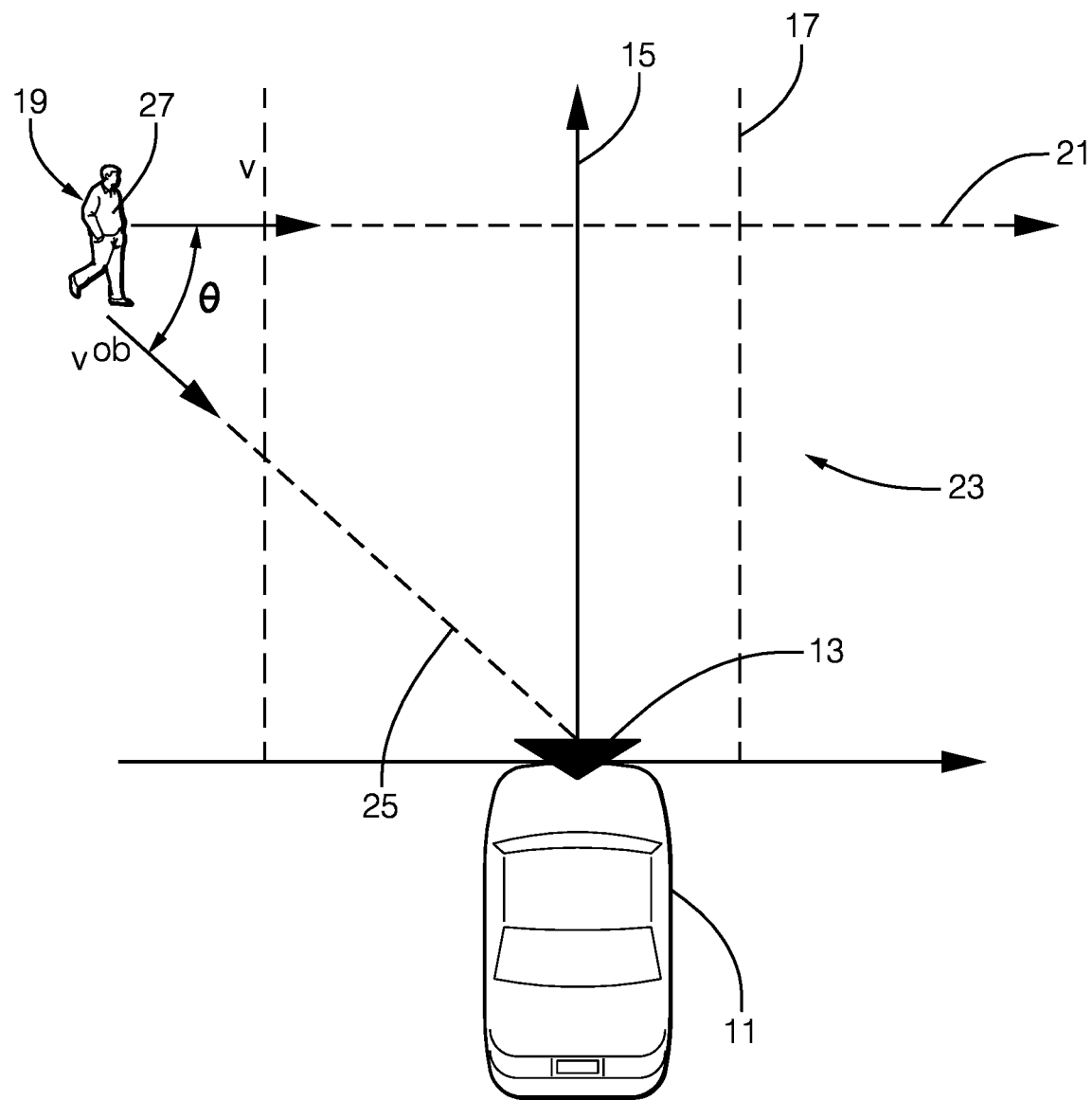
FIG. 1 shows, in a top view, a motor vehicle, a radar sensor system mounted to the motor vehicle and a pedestrian to be detected by the radar sensor system.

In FIG. 1, there is shown a motor vehicle 11 and a radar sensor system 13 mounted to a front section of the motor vehicle 11. The radar sensor system 13 is preferably based on a millimeter wave radar sensor. A single channel radar sensor may be provided to minimize the production costs, while a multiple channel radar sensor may be provided to enhance the detection performance. The radar sensor system 13 can be connected to an electronic processing device (not shown), for example an advanced emergency braking system, a pedestrian collision avoidance system or an autonomous driving system. While a central mounting of the radar sensor system 13 is shown, a mounting to a corner section, a side section or a rear section of the motor vehicle 11 could equally be provided.

In operation, the motor vehicle 11 is moving in a driving direction 15 on a lane 17. An object 19 in the form of a pedestrian crossing the lane 17 is present in the observation space 23 in front of the motor vehicle 11. The object 19 is moving in a moving direction 21. Other examples of objects to be observed by the radar sensor system 13 are cyclists and vehicles.

The radar sensor system 13 is configured for transmitting a primary radar signal into the observation space 23 and for detecting objects 19 present in the observation space 23 on the basis of a secondary radar signal reflected by the objects 19. The line of sight 25 which extends from the object 19 to the active region of the radar sensor system 13 is called "line of sight". The observed bulk speed $v^{ob}$ of the object 19, i. e. the speed component related to the main body 27 of the object 19 and oriented along the line of sight 25, can be determined in a known manner using the Doppler effect. Specifically, it is known that the relationship between the observed bulk speed $v^{ob}$ and the speed v of the object 19 in the moving direction 21 is given as:

$$v = v^{ob}/\cos(\theta)$$

wherein θ is the illumination angle, i.e. the angle between the moving direction 21 and the line of sight 25.

Figure 2:
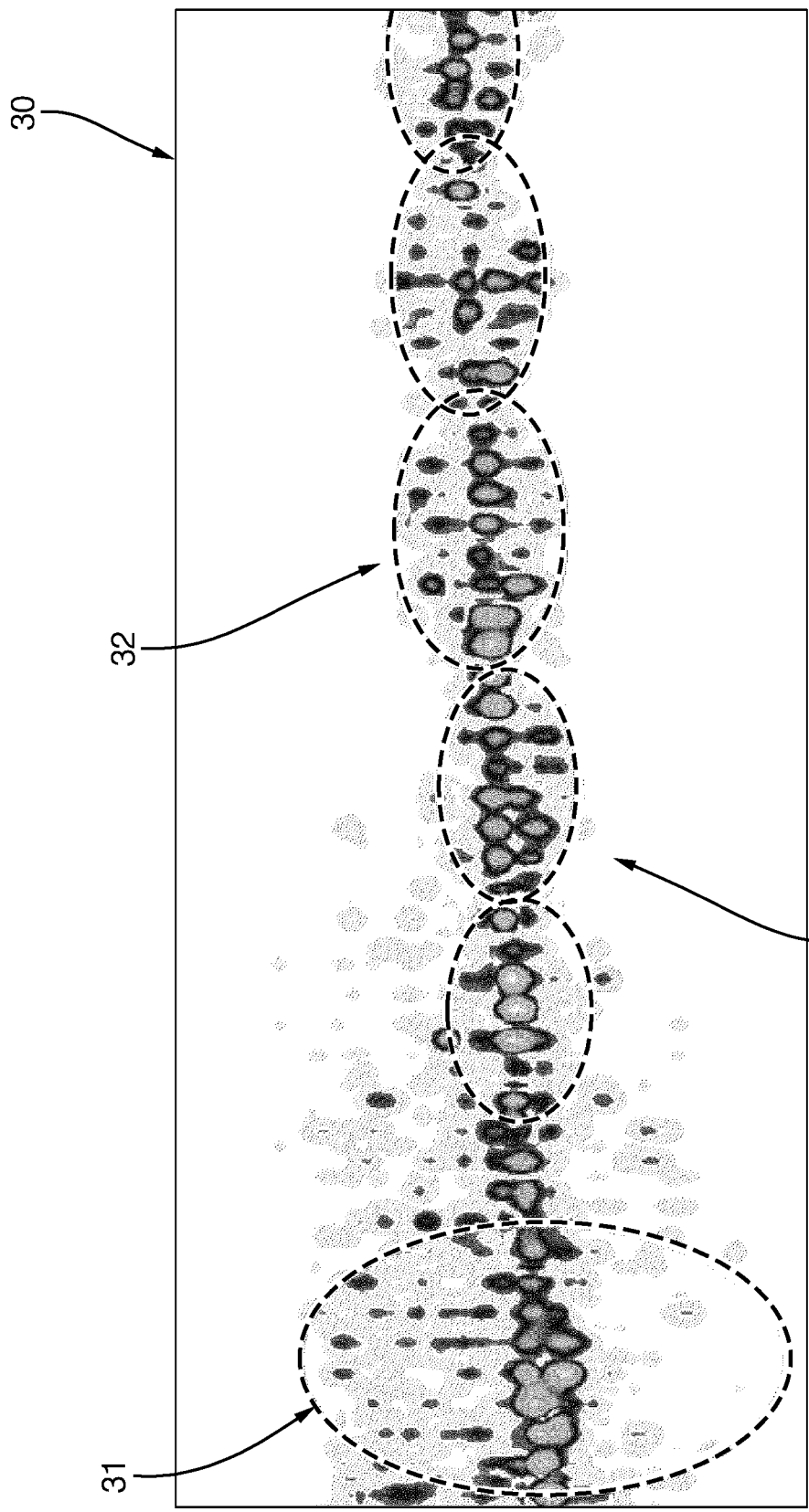
FIG. 2 shows a Micro-Doppler spectrogram generated by the radar sensor system according to FIG. 1.

An exemplary Micro-Doppler spectrogram 30 of a moving cyclist is shown in FIG. 2. The horizontal axis is a time axis, whereas the vertical axis is a Doppler shift axis or a radial velocity axis. The generation of the Micro-Doppler spectrogram 30 can be carried out by means of a Short-Time-Fourier-Transform (STFT) or a Wigner-Ville-Distribution technique (WVD technique). In the left portion of FIG. 2, there is indicated a first Micro-Doppler pattern 31 that corresponds to a wheel rotation cycle. To the right of the first Micro-Doppler pattern 31, there are several further Micro-Doppler patterns 32 that correspond to pedal rotation cycles. A Micro-Doppler spectrogram of a pedestrian, a motor vehicle or a helicopter includes similar Micro-Doppler patterns that correspond to a gait cycle of the pedestrian, a wheel rotation of the motor vehicle or a rotor blade movement of the helicopter, respectively.

Since the motions of individual components of an observed object 19 like arms, legs, wheels, pedals or rotor blades usually are of an essentially periodic nature, the Micro-Doppler patterns 31, 32 caused by these motions are at least essentially periodic. By determining a periodicity quantity relating to a Micro-Doppler pattern 31, 32, it is possible do discriminate between different types of objects 19, for example between pedestrians and cyclists or between adults and children. The periodicity quantity can be an average cycle duration, an average repetition frequency or a number of time bins related to one period or cycle of the corresponding pattern. In case of a pedestrian, the periodicity quantity is characteristic for the pedestrian's gait cycle.

According to the invention, a periodicity quantity relating to an at least essentially periodic motion of a part of the object 19 is determined on the basis of a Micro-Doppler spectrogram analysis by means of the electronic processing device, as is explained in greater detail below.

Figure 3:
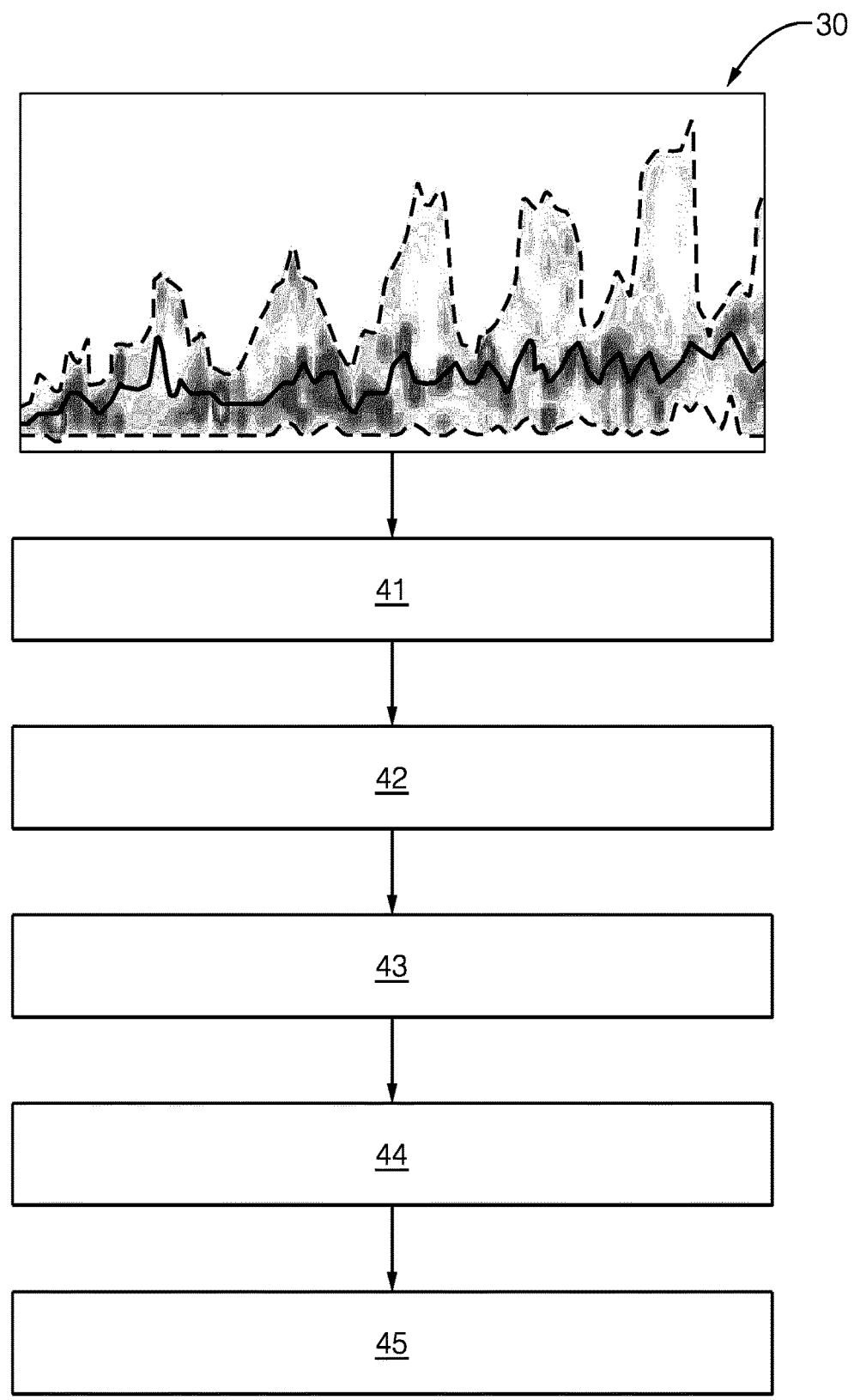
FIG. 3 is a flowchart showing different steps of a method according to an embodiment of the invention.

As shown in FIG. 3, a Micro-Doppler spectrogram 30 is generated as an input for the subsequent steps. In a step 41, the course of a periodic signal component corresponding to a Micro-Doppler pattern 31, 32 is determined. In a step 42, a spread measure of the signal component is estimated. In a step 43, a smoothed curve is fitted to the periodic signal component by means of an adaptive curve-fitting process. In a step 44, the positions of the peaks and/or valleys of the smoothed curve are determined. In a step 45, a periodicity quantity is determined based on the determined positions of the peaks and valleys.

Figure 4:
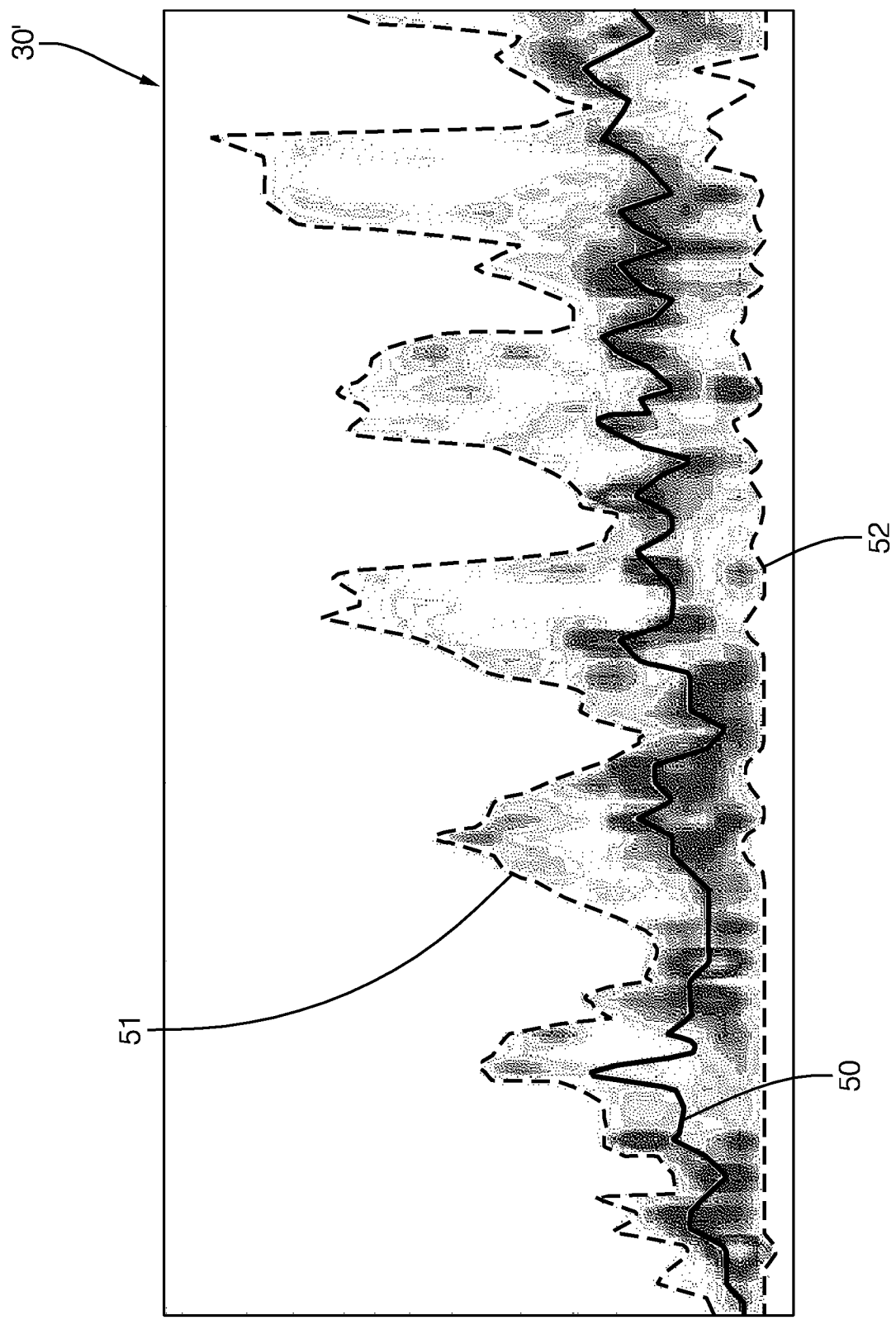
FIG. 4 shows an enlarged section of a Micro-Doppler spectrogram.

FIG. 4 shows an exemplary Micro-Doppler spectrogram 30' of a pedestrian in an enlarged view. Three curves corresponding to the courses of different motion components are shown in the Micro-Doppler spectrogram 30'. Specifically, the periodic signal component 50 of the observed bulk speed $v^{ob}$ is shown as a solid black line, whereas the upper envelope 51 of the Micro-Doppler spectrogram 30' and the lower envelope 52 of the Micro-Doppler spectrogram 30' are shown as dashed lines.

To determine the periodic signal component 50 of the observed bulk speed $v^{ob}$, the upper envelope 51 and the lower envelope 52, the cumulative amplitude distribution function is determined for each time slice. The periodic signal component 50 of the observed bulk speed $v^{ob}$ is assigned to a percentile of about 50% of the cumulative amplitude distribution function. The upper envelope 51 is assigned to a percentile of about 95% of the cumulative amplitude distribution function, whereas the lower envelope 52 is assigned to a percentile of about 5% of the cumulative amplitude distribution function.

The spread of the Micro-Doppler spectrogram 30' is estimated by determining the envelope difference $E_{diff}$; i.e. the absolute value of the difference between the upper envelope 51 and the lower envelope 52:

$$E_{diff} = |E_{upper} - E_{lower}|$$

Figure 5:
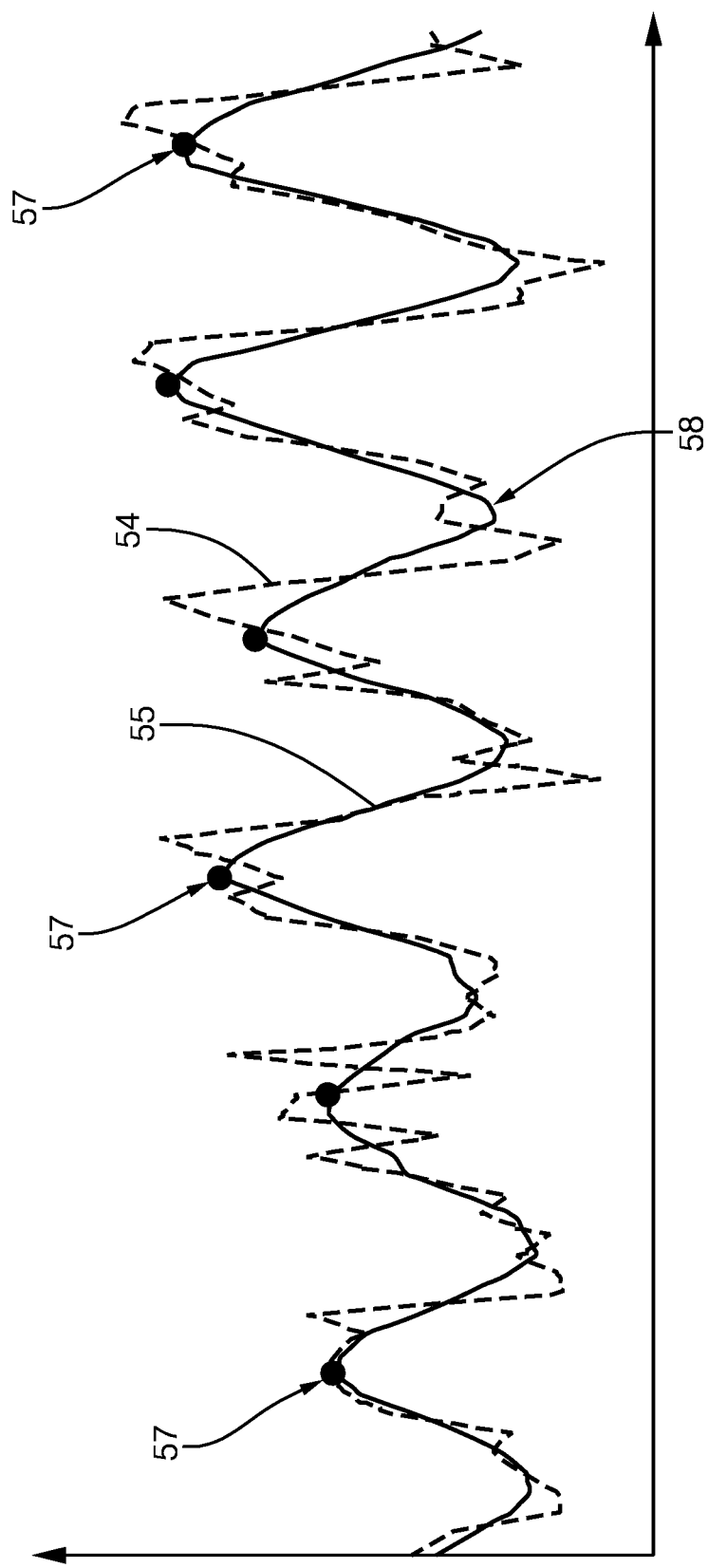
FIG. 5 shows the course of a periodic signal component corresponding to an at least essentially periodic pattern of a Micro-Doppler spectrogram as well as a smoothed curve fitted to the course.

An exemplary periodic signal component 54 of $E_{diff}$ over time is shown in FIG. 5. A smoothed curve 55 fitted to this periodic signal component 54 in step 43 (FIG. 3) is equally shown. The window size used in the adaptive curve-fitting process is adapted to the variation of the observed bulk speed $v^{ob}$. According to an embodiment of the invention, the window size $N_n^{win}$ at the time $t_n$ is given as:

$$N_n^{win} = \text{round}\left(N_{n-1}^{win} \left[\frac{V_{n-1}^{ob}}{V_n^{ob}}\right]\right) \quad (1)$$

wherein the subscripts n, n−1 indicate the current state and the previous state, respectively, and the function round(•) returns the nearest integer value of the input.

The initial value of the window size can be set as:

$$N_0^{win} = \text{round}\left(\frac{L_0^{cycle}}{\Delta t * V_0}\right) \quad (2)$$

wherein $\Delta t$ is the time-bin resolution of the Micro-Doppler spectrogram 30, 30', $L_0^{cycle}$ is the average length of the related periodic motion cycle and $V_0$ is the average speed of the object 19. In the context of the recognition of pedestrians, a preferred value for $L_0^{cycle}$ is 1.4 m, since the typical gait-cycle of a pedestrian is around 1.2 m-1.6 m, whereas a preferred value for $V_0$ is 1.5 m/s.

The adaptive curve fitting process in step 43 (FIG. 3) is carried out by means of a kernel function. Preferably, a kernel function is selected that smooths the raw signal so as to remove high frequency components while simultaneously maintaining the peak magnitude levels. Preferred kernel functions are high-order least-square polynomial kernels and high-order Savitzky-Golay kernels. According to a specific embodiment, a $2^{nd}$ order or a $3^{rd}$ order kernel is selected.

In step 44 (FIG. 3), a peak finding process is performed to find the peaks 57 of the smoothed curve 55. In particular, peaks 57 are determined that satisfy the following conditions:

It is a local peak, and
the minimum distance between each two consecutive peaks is larger than $k \cdot N_n^{win}$, where k is a scale factor. Typical values for k range from 0.5 to 1, preferably from 0.7 to 0.9.

The last mentioned condition increases the robustness of the peak finding process. Instead of the peaks 57 or in additions to the peaks 57, the valleys 58 of the smoothed curve 55 can be found in an analogous manner.

Supposing that $N_n^{cycle}$ is the number of samples contained in one cycle of a Micro-Doppler pattern 31, 32 near time slice $t_n$, the cycle duration or period $T_n^{cycle}$ can be expressed as:

$$T_n^{cycle} = N_n^{cycle} * \Delta t \quad (3)$$

The repetition frequency $f_n^{cycle}$ of a Micro Doppler pattern 31, 32 is the reciprocal of the period $T_n^{cycle}$:

$$f_n^{cycle} = \frac{1}{T_n^{cycle}} \quad (4)$$

Once $N_n^{cycle}$ is determined, the period $T_n^{cycle}$ and the repetition frequency $f_n^{cycle}$ of the corresponding Micro-Doppler pattern 31, 32 can be determined.

Supposing that $D_n$ is the number of samples that are present between two consecutive peaks 57 near time slice $t_n$, the relationship between $D_n$ and $N_n^{cycle}$ is $N_n^{cycle} = 2 \cdot D_n$ for pedestrians and $N_n^{cycle} = D_n$ for objects having rotating components such as bikes, motor vehicles or helicopters.

For pedestrians, the duration between two consecutive peaks 57 or valleys 58 is the duration of one footstep cycle. A gait-cycle includes two footsteps.

To further improve the robustness of the method according to the invention, a recursive state estimator, in particular a Kalman filter, can be used. In an algorithm based on a Kalman Filter, the state space model and the measurement model can be given as:

$$\begin{bmatrix} V_n \\ \dot{V}_n \\ L_n^{cycle} \end{bmatrix} = \begin{bmatrix} 1 & \Delta t & 0 \\ 0 & 1 & 0 \\ 0 & 0 & 1 \end{bmatrix} \begin{bmatrix} V_{n-1} \\ V'_{n-1} \\ L_{n-1}^{cycle} \end{bmatrix} + w_{n-1}$$

$$T_n^{cycle} = \frac{L_n^{cycle}}{V_n} + q_n$$

wherein the random variables $w_{n-1}$ and $q_n$ represent the process noise and the measurement noise. The subscripts n, n−1 indicate the current state and the previous state, respectively. The dot refers to the derivative of V.

The peaks 57 found in the peak finding process can be used for a segmentation process, wherein the starting point and the ending point of the corresponding Micro-Doppler pattern 31, 32 are determined. For example, the first peak 57 of a sequence of peaks 57 can be defined as a starting position of a segment, whereas the last peak 57 of a sequence of peaks 57 is defined as an ending position of a segment.

The invention enables a reliable recognition of moving objects 19 by means of a radar sensor system 13 even in case the available observation time is rather short. While this invention has been described in terms of the preferred embodiments thereof, it is not intended to be so limited, but rather only to the extent set forth in the claims that follow.

We claim:

1. A method for a recognition of an object by a radar sensor system, the method comprising:
   transmitting a primary radar signal into an observation space;
   receiving a secondary radar signal reflected by the object;
   generating a Micro-Doppler spectrogram of the secondary radar signal; and
   determining at least one periodicity quantity relating to an at least essentially periodic motion of a part of the object is determined based on the Micro-Doppler spectrogram, wherein the determining of the at least one periodicity quantity includes the steps:
   (i) determining a course of at least one periodic signal component corresponding to an at least essentially micro-Doppler pattern of the Micro-Doppler spectrogram,
   (ii) fitting a smoothed curve to the periodic signal component,
   (iii) determining positions of a plurality of peaks and valleys of the smoothed curve, and
   (iv) determining the periodicity quantity based on the determined positions of peaks and valleys.

2. The method in accordance with claim 1, wherein in the step (ii), the smoothed curve is fitted to the periodic signal component by an adaptive curve-fitting process.

3. The method in accordance with claim 2, wherein at least one process parameter of the adaptive curve-fitting process is continuously adapted during the curve-fitting process.

4. The method in accordance with claim 3, wherein the process parameter is adapted based on a determined speed variation of the object.

5. The method in accordance with claim 1, wherein in step (i), the course of an upper envelope, a lower envelope and a difference between an upper envelope and a lower envelope of the Micro-Doppler spectrogram is determined as the at least one periodic signal component.

6. The method in accordance with claim 1, wherein in step (ii), the fitting of the smoothed curve to the periodic signal component is performed using a window function, in particular using a triangle kernel, a polynomial kernel or a Savitzky-Golay kernel.

7. The method in accordance with claim 6, wherein a window size of the window function is continuously adapted during the fitting of the smoothed curve to the periodic signal component.

8. The method in accordance with claim 1, wherein the Micro-Doppler spectrogram is generated by a time-frequency analysis, in particular by a Short-Time-Fourier-Transform or a Wigner-Ville-Distribution technique.

9. The method in accordance with claim 1, wherein the step (iii) includes a segmentation process, wherein a first peak of a sequence of peaks is defined as a starting position of a segment and a last peak of a sequence of peaks is defined as an ending position of a segment.

10. The method in accordance with claim 1, wherein in step (iv), the periodicity quantity is estimated by a recursive state estimator.

11. The method in accordance with claim 1, wherein the step (i) includes determining a spread measure of the Micro-Doppler spectrogram.

12. The method in accordance with claim 1, wherein the periodic signal component is determined by a percentile-based method or a curve-fitting method.

13. A system comprising:
   an electronic processing device configured to:
      receive, from a radar sensor, a secondary radar signal reflected by an object;
      generate a Micro-Doppler spectrogram based on the secondary radar signal;
      determine at least one periodicity quantity relating to an at least essentially periodic motion of a part of the object based on the Micro-Doppler spectrogram;
      determine the at least one periodicity quantity by determining a course of at least one periodic signal component corresponding to an at least essentially micro-Doppler pattern of the Micro-Doppler spectrogram;
      fit a smoothed curve to the periodic signal component by determining positions of a plurality of one of the peaks and valleys of the smoothed curve; and
      determine the periodicity quantity based on the determined positions of one of the peaks and valleys.

14. The system in accordance with claim 13, wherein the smoothed curve is fitted to the periodic signal component by an adaptive curve-fitting process.

15. The system in accordance with claim 14, wherein at least one process parameter of the adaptive curve-fitting process is continuously adapted during the curve-fitting process.

16. The system in accordance with claim 13, wherein the fitting of the smoothed curve to the periodic signal component is performed using a window function, in particular using a triangle kernel, a polynomial kernel or a Savitzky-Golay kernel.

17. The system in accordance with claim 13, wherein the course of an upper envelope, a lower envelope, and a difference between an upper envelope and a lower envelope of the Micro-Doppler spectrogram is determined as the at least one periodic signal component.

* * * * *